(12) United States Patent
Yeh et al.

(10) Patent No.: US 9,903,415 B2
(45) Date of Patent: Feb. 27, 2018

(54) MOTOR

(71) Applicant: DELTA ELECTRONICS, INC., Taoyuan Hsien (TW)

(72) Inventors: Cheng-Hsien Yeh, Taoyuan Hsien (TW); Chih-Wei Chan, Taoyuan Hsien (TW); Chao-Wen Lu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 77 days.

(21) Appl. No.: 14/511,857

(22) Filed: Oct. 10, 2014

(65) Prior Publication Data

US 2015/0192171 A1 Jul. 9, 2015

Related U.S. Application Data

(60) Provisional application No. 61/924,925, filed on Jan. 8, 2014.

(30) Foreign Application Priority Data

Mar. 13, 2014 (CN) .................... 2014 2 0115061 U (51) Int. Cl.
| | |
|---|---|
| F16C 33/74 | (2006.01) |
| F16C 33/72 | (2006.01) |
| F16C 17/10 | (2006.01) |
| H02K 7/08 | (2006.01) |
| F04D 25/06 | (2006.01) |
| F04D 29/051 | (2006.01) |

(Continued)

(52) U.S. Cl.
CPC ............ *F16C 33/74* (2013.01); *F04D 25/062* (2013.01); *F04D 29/0513* (2013.01); *F16C 17/107* (2013.01); *F16C 33/726* (2013.01); *H02K 7/086* (2013.01); *F04D 19/002* (2013.01); *F04D 25/0626* (2013.01); *F16C 33/103* (2013.01); *F16C 33/107* (2013.01); *F16C 33/1085* (2013.01); *F16C 2360/46* (2013.01); *F16C 2380/26* (2013.01)

(58) Field of Classification Search
CPC ........ F16C 17/02; F16C 17/026; F16C 17/10; F16C 17/102; F16C 33/72; F16C 33/723; F16C 33/726; F16C 33/74; F16C 2360/46; F16C 2370/12; H02K 7/086
USPC .......................................... 384/100, 107, 114
See application file for complete search history.

(56) References Cited

U.S. PATENT DOCUMENTS

| | | | | |
|---|---|---|---|---|
| 7,153,028 | B2 * | 12/2006 | Oelsch | F16C 32/06 384/100 |
| 7,435,002 | B2 * | 10/2008 | Nakagawa | F16C 17/02 384/107 |

(Continued)

*Primary Examiner* — James Pilkington
(74) *Attorney, Agent, or Firm* — Muncy, Geissler, Olds & Lowe, P.C.

(57) ABSTRACT

A motor includes a shaft, a rotor shell, a bushing, a bearing, and a thrust plate. The rotor shell is connected with the shaft. The bushing has an accommodating space. The bearing is disposed in the accommodating space, and the shaft is disposed through the bearing. The thrust plate is connected with the shaft, and is disposed between a bottom of the accommodating space and a bottom of the bearing. At least one surface of the thrust plate is formed with a plurality of grooves tapering off from an edge to a center.

9 Claims, 9 Drawing Sheets

(51) Int. Cl.
*F16C 33/10* (2006.01)
*F04D 19/00* (2006.01)

(56) References Cited

U.S. PATENT DOCUMENTS

| | | | | |
|---|---|---|---|---|
| 7,473,034 B2* | 1/2009 | Saito | ............... | F16C 17/102 |
| | | | | 384/107 |
| 7,513,688 B2* | 4/2009 | Uenosono | ............ | F16C 17/107 |
| | | | | 384/100 |
| 7,650,697 B2* | 1/2010 | Gomyo | ............... | F16C 33/103 |
| | | | | 29/898 |
| 8,240,918 B2* | 8/2012 | Bitou | ............... | F16C 17/107 |
| | | | | 29/898.02 |
| 2003/0091249 A1* | 5/2003 | Kurimura | ............ | F16C 17/026 |
| | | | | 384/100 |
| 2005/0074191 A1* | 4/2005 | Braun | ............... | F16C 17/107 |
| | | | | 384/100 |
| 2005/0147334 A1* | 7/2005 | Kanazawa | ............ | F16C 17/02 |
| | | | | 384/100 |
| 2007/0177831 A1* | 8/2007 | Shibahara | ............ | B29C 45/261 |
| | | | | 384/107 |
| 2008/0239570 A1* | 10/2008 | Kumoi | ............... | G11B 17/0282 |
| | | | | 360/135 |
| 2009/0148084 A1* | 6/2009 | Komori | ............... | F16C 3/02 |
| | | | | 384/107 |
| 2011/0031833 A1* | 2/2011 | Yu | ............... | F16C 33/745 |
| | | | | 310/90 |
| 2012/0230618 A1* | 9/2012 | Suzuki | ............... | F16C 17/107 |
| | | | | 384/120 |
| 2013/0234551 A1* | 9/2013 | Yu | ............... | F16C 32/0633 |
| | | | | 310/90 |

\* cited by examiner

MOTOR

CROSS REFERENCE TO RELATED APPLICATIONS

The non-provisional patent application claims priority to U.S. provisional patent application with Ser. No. 61/924,925 filed on Jan. 8, 2014 and under 35 U.S.C. § 119(a) on Patent Application No(s). 201420115061.8 filed in People's Republic of China on Mar. 13, 2014. This and all other extrinsic materials discussed herein are incorporated by reference in their entirety.

BACKGROUND OF THE INVENTION

Field of Invention

The present invention relates to a motor.

Related Art

In general, the operation environment of a fan is not always stable and ideal. When the fan is operated in a shacking, vibration or reversed situation, the shaft of the motor may easily shifted. This will cause the contact and wearing of the shaft and the bearing, which decreases the quality and lifespan of the fan.

Besides, the leakage of the lubricant inside the bearing may also affect the quality and lifespan of the fan. If the waste gas generated from the lubricant as the fan operates can not be properly exhausted, the quality and lifespan of the fan may further decreased.

SUMMARY OF THE INVENTION

An objective of the present invention is to provide a motor with improved quality and lifespan.

To achieve the above objective, the present invention discloses a motor including a shaft, a rotor shell, a bushing, a bearing, and a thrust plate. The rotor shell is connected with the shaft. The bushing has an accommodating space. The bearing is disposed in the accommodating space, and the shaft is disposed through the bearing. The thrust plate is connected with the shaft, and is disposed between a bottom of the accommodating space and a bottom of the bearing. At least one surface of the thrust plate is formed with a plurality of grooves tapering off from an edge to a center.

In one embodiment, the thrust plate is located at an end of the shaft.

In one embodiment, the motor further includes an oil seal covering the bearing and formed with at least one through hole or a discharge trench.

In one embodiment, a side wall of the bushing is formed with at least one or more channels for communicating the bottom and a top of the bearing.

In one embodiment, the motor further includes an oil repellent layer formed on a surface of an oil seal covering the bearing, a surface of the bushing, or a surface of the rotor shell facing the bearing.

In one embodiment, the bearing is an oil bearing, a hydrodynamic bearing or a ceramic bearing.

In one embodiment, the end of the shaft has a spherical surface or a curved surface.

In one embodiment, a bottom surface of the bearing has at least one pattern.

In one embodiment, the bottom of the accommodating space is configured with a wear plate corresponding to the shaft.

In one embodiment, the motor further includes a base, and the base and the bushing can be integrated as a single structure or detachable structures.

To achieve the above objective, the present invention also discloses a motor including a shaft, a rotor shell, a bushing, a bearing and a thrust plate. The rotor shell is connected with the shaft. The bushing has an accommodating space and is formed with at least one or more through holes or discharging trenches for gas. The bearing is disposed in the accommodating space, and the shaft is disposed through the bearing. The thrust plate is connected with the shaft and disposed between a bottom of the accommodating space and a bottom of the bearing.

In one embodiment, at least one surface of the thrust plate is formed with a plurality of grooves tapering off from an edge to a center of the thrust plate.

In one embodiment, the motor further includes an oil seal, which is formed with at least one through hole or a discharge trench.

In one embodiment, the motor further includes a base, wherein the base and the bushing are integrated as a single structure or detachable structures.

In one embodiment, the motor further includes an oil repellent layer formed on a surface of an oil seal covering the bearing, a surface of the bushing, or a surface of the rotor shell facing the bearing.

In one embodiment, the bearing is an oil bearing, a hydrodynamic bearing or a ceramic bearing.

In one embodiment, a bottom surface of the bearing has at least one pattern.

In one embodiment, the bottom of the accommodating space is configured with a wear plate corresponding to the shaft.

To achieve the above objective, the present invention further discloses a motor including a shaft, a rotor shell, a bushing, a bearing and a thrust plate. The rotor shell is connected with the shaft. The bushing has an accommodating space. The bearing is disposed in the accommodating space, and the shaft is disposed through the bearing. A bottom surface of the bearing has at least one pattern. The thrust plate is connected with the shaft and disposed between a bottom of the accommodating space and a bottom of the bearing.

In one embodiment, the motor further includes a base, and the base and the bushing are integrated as a single structure or detachable structures.

As mentioned above, the motor of the invention is configured with a thrust plate for maintaining the axial balance of the rotor structure, thereby increasing the lifespan of the bearing and the quality of the motor.

In some embodiments, the bushing or oil seal is designed with a channel, discharge trench or through hole, so that the waste gas generated inside the bushing as the motor operates can be properly exhausted. Thus, the operation of the motor will not be affected so as to increase the lifespan of the bearing and the quality of the motor.

In addition, it is also possible to provide an oil repellent layer for decreasing the adhesive force of the lubricant, thereby preventing the leakage of the lubricant and thus increasing the lifespan of the motor.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
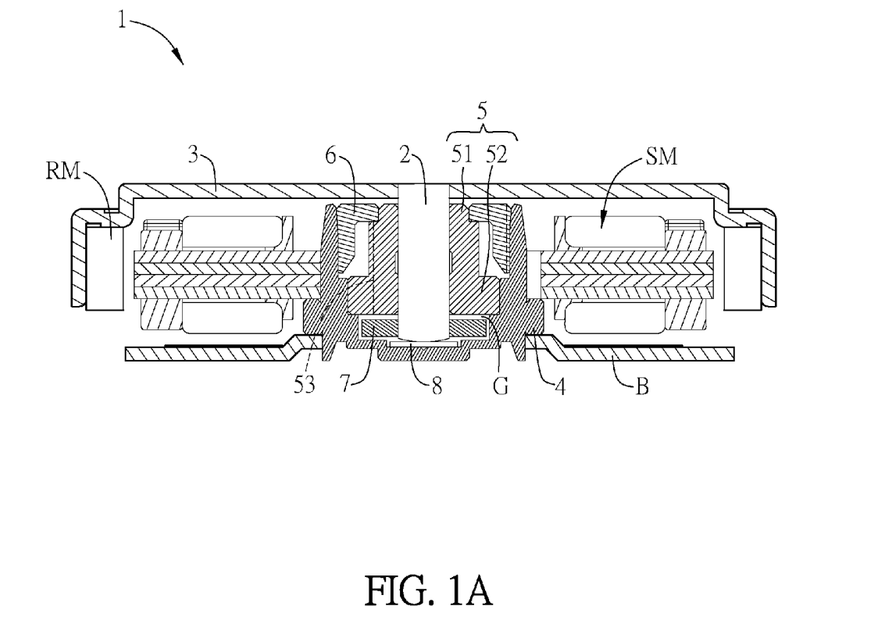
FIG. 1A is a schematic diagram showing a motor according to a preferred embodiment of the invention.
Figure 1B:
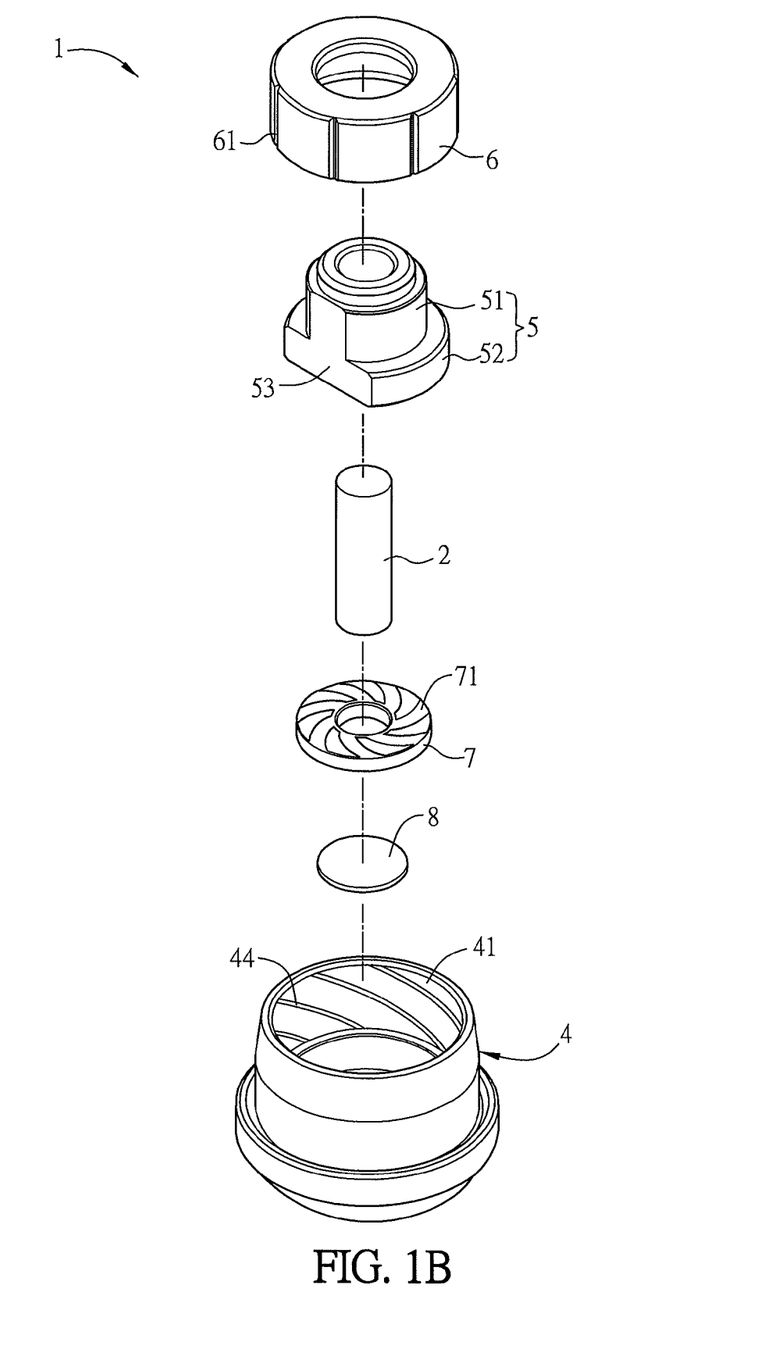
FIG. 1B is an exploded view of a part of the motor according to the preferred embodiment of the invention.
Figure 1C:
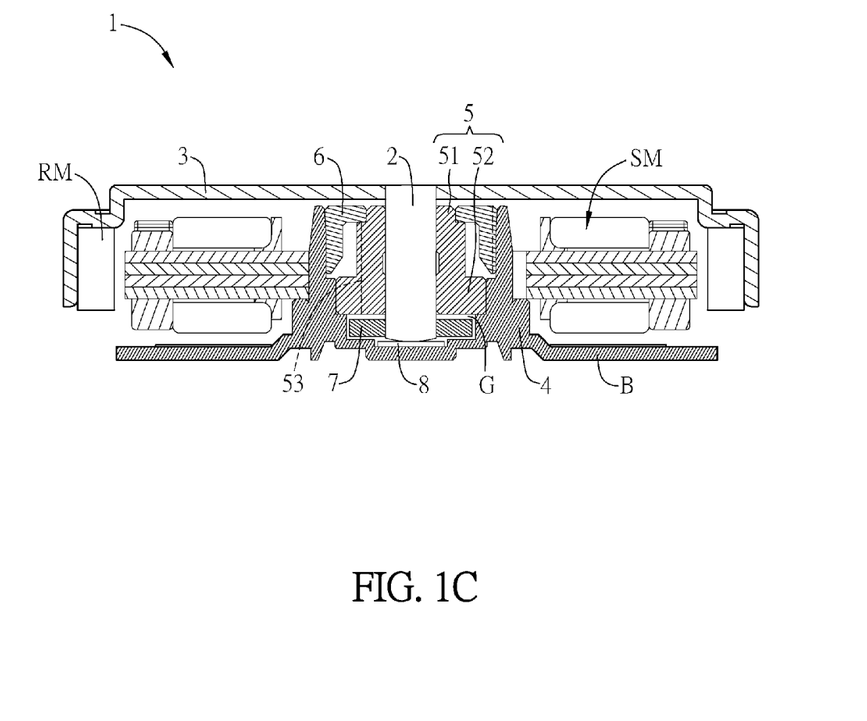
FIG. 1C is a schematic diagram showing a motor according to a preferred embodiment of the invention.

FIG. 1A is a schematic diagram showing a motor 1 according to a preferred embodiment of the invention, and FIG. 1B is an exploded view of a part of the motor 1. Referring to FIGS. 1A and 1B, the motor 1 includes a shaft 2, a rotor shell 3, a bushing 4, a bearing 5, an oil seal 6 and a thrust plate 7. In this case, the shaft 2, the rotor shell 3 and the thrust plate 7 are defined in the rotor structure, and the bushing 4, the bearing 5 and the oil seal 6 are defined in the stator structure. Besides, the motor 1 may further include a base B, which can be integrated with the bushing 4 to form a single structure (shown in FIG. 1C) or separated from the bushing 4, for supporting the stator structure.

One end of the shaft 2 is formed with a spherical surface or a curved surface for further improving the efficiency and lifespan of the motor 1.

Figure 2:
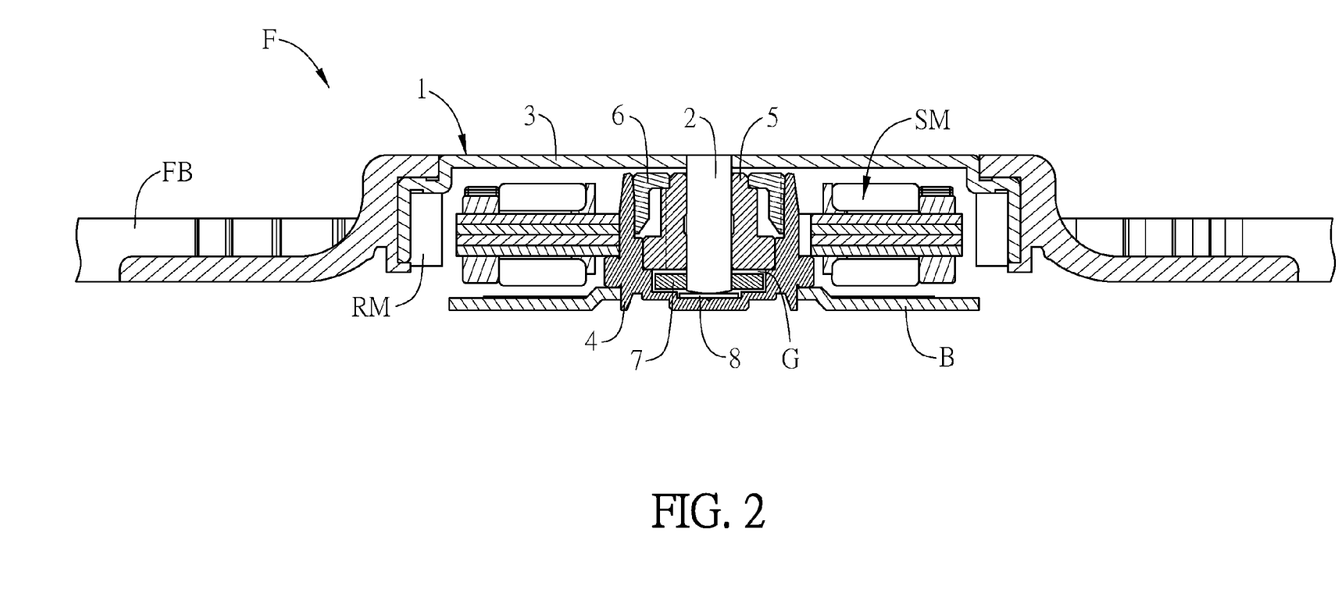
FIG. 2 is a schematic diagram showing a motor configured with blades according to the preferred embodiment of the invention.

The rotor shell 3 is connected with the shaft 2. In this embodiment, the rotor shell 3 and the shaft 2 are connected by welding (e.g. laser welding). Of course, in other aspects, they can also be connected by, for example but not limited to, screwing, interference fitting, or integral formation. Moreover, the rotor shell 3 can be configured with a rotor magnet set RM corresponding to the stator magnet set SM of the base B. To be noted, the rotor shell 3 of the motor 1 may be configured with at least one or more blades FB for functioning as a fan (see the fan F of FIG. 2). Since the blades FB are well known in the art, the detailed description thereof will be omitted.

The bushing 4 has an accommodating space 41, the bearing 5 is located in the accommodating space 41, and the shaft 2 is disposed through the bearing 5. In this embodiment, the accommodating space 41 is injected with lubricant for assisting the rotation of the shaft 2. Herein, the bearing 5 is preferably an oil bearing, a hydrodynamic bearing or a ceramic bearing. In addition, a bottom of the accommodating space 41 can be configured with a wear plate 8 corresponding to the shaft 2. When one end of the shaft 2 is contact with the wear plate 8, it is possible to reduce the wearing of the shaft 2 as the shaft 2 is rotated. This configuration can extend the lifetime of the shaft 2 and thus improve the efficiency and lifespan of the motor or fan.

Figure 3:
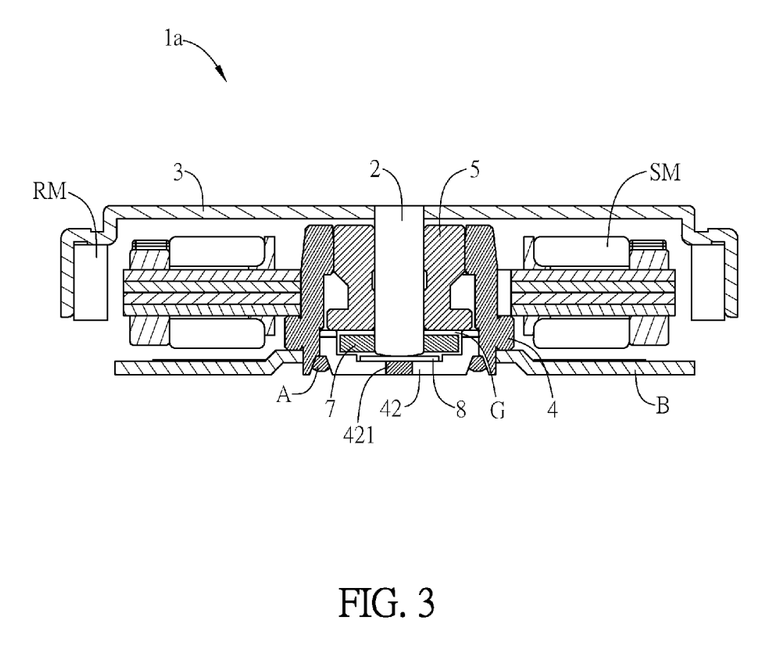
FIG. 3 is a schematic diagram showing a motor according to another preferred embodiment of the invention.

In this embodiment, the bottom and the annular wall of the bushing 4 are originally integrated as a single structure. However, in other aspects, the bushing 4 of a motor 1*a* according to another embodiment as shown in FIG. 3 is designed with a detachable cover 42 at the bottom of the bushing 4. The cover 42 is preferably configured with a discharge hole 421. In such a case with the discharge hole 421, the lubricant can be injected into the accommodating space 41 through the discharge hole 421. This is benefit in reducing air contained in the lubricant, and thus further improving the lubrication effect of the lubricant. The lubricant can be injected into the accommodating space 41 through the discharging hole 421 by way of vacuum filling. In addition, after injecting the lubricant into the accommodating space 41, the leak(s) around the cover 42 and the discharging hole 421 can be applied with an adhesive layer A for preventing the leakage of the lubricant.

Referring to FIGS. 1A and 1B, in this embodiment, the bearing 5 has a top end portion 51 and bottom end portion 52. The top end portion 51 is close to the end of the rotor shell 3, and the bottom end portion 52 is close to the end of the bottom of the accommodating space 41. When the diameter of the bottom end portion 52 is greater than that of the top end portion 51, the effect of using the oil seal 6 to cover the bearing 5 can be sufficiently improved. However, in other aspects, the bearing 5 can be a cylindrical structure with uniform radius, and this invention is not limited.

The bearing 5 may have a cut-off design, which means the bearing 5 is not a complete cylinder. In more detail, the bearing 5 may have a T-shaped cut-off surface 53, which extends to the top end portion 51 and the bottom end portion 52 of the bearing 5 but does not pass through the axis of the bearing 5. Thus, this design will not affect the rotation of the shaft 2, which is disposed through the bearing 5. When the bearing 5 is located in the accommodating space 41 of the bushing 4, the cut-off surface and the inner wall of the bushing 4 can form a discharging channel. Accordingly, once the motor 1 is operating, the waste gas generated inside the bushing 4 can be exhausted through the discharging channel so as to prevent the undesired effect to the operation of the motor 1. The term "cut-off surface" may include a planar surface, a curved surface or any irregular surface which can form a proper discharging channel with the inner wall of the bushing 4. Besides, the inner surface of the bearing 5 corresponding to the shaft 2 may have a hydrodynamic pattern for preventing the hydrodynamic pressure of the shaft 2 due to the lubricant from contacting the inner surface of the bearing 5. This configuration can extend the lifetime of the shaft 2 and the bearing 5, thereby improving the effect and lifespan of the motor or the fan. Moreover, the hydrodynamic pattern may be various with respect to the rotation direction of the motor 1, and this embodiment is not limited. The design of the hydrodynamic pattern is well known in the art, so the detailed description thereof will be omitted.

Referring to FIGS. 1A and 1B again, in this embodiment, the oil seal 6 covers the bearing 5. The oil seal 6 can have an annular structure, and the inner diameter of the oil seal 6 is between the outer diameters of the top end portion 51 and the bottom end portion 52. Accordingly, the oil seal 6 can be stopped before the bottom end portion 52 and will not reach the bottom of the accommodating space 41. In addition, the inner surface of the oil seal 6 will slightly interfere the top end portion 51 of the bearing 5, and the outer surface of the oil seal 6 will heavily interfere the inner wall of the bushing 4. In this case, the oil seal 6 can prevent the leakage of the lubricant and firmly fix the height of the bearing 5 in the accommodating space 41, thereby further avoiding the radius rotation of the bearing 5. Besides, when the bearing 5 has uniform radius, the configuration of the oil seal 6 can increase the interference between the bearing 5 and the bushing 4 so as to achieve the effects of preventing lubricant leakage and fixing the bearing 5.

The thrust plate 7 is connected with the shaft 2 and is located between the bottoms of the accommodating space 41 and the bearing 5. In this embodiment, the thrust plate 7 and the shaft 2 are heavily interference fitted, so that the thrust plate 7 can rotate along with the shaft 2 and have axial shift simultaneously. Except the above-mentioned heavily interference fitting, the thrust plate 7 and the shaft 2 can also be connected by welding (e.g. laser welding), or they can be integrated as a single structure. Any method for connecting the thrust plate 7 and the shaft 2 that allows the thrust plate 7 to be rotated along with the shaft 2 can be considered. In addition, the shaft 2 may be disposed through and connected with the thrust plate 7, or the thrust plate 7 can be located at the end of the shaft 2. This invention is not limited thereto. When the thrust plate 7 can be located at the end of the shaft 2, the dimension of the shaft 2 can be reduced so as to minimize the volume of the accommodating space 41. This feature can reduce the entire size of the motor 1 or the fan.

The thrust plate 7 can be made of, for example but not limited to, porous materials, copper, alloy or ceramics by way of die casting, lathe part production, or metal injection molding. This invention is not limited thereto.

Figure 4A:
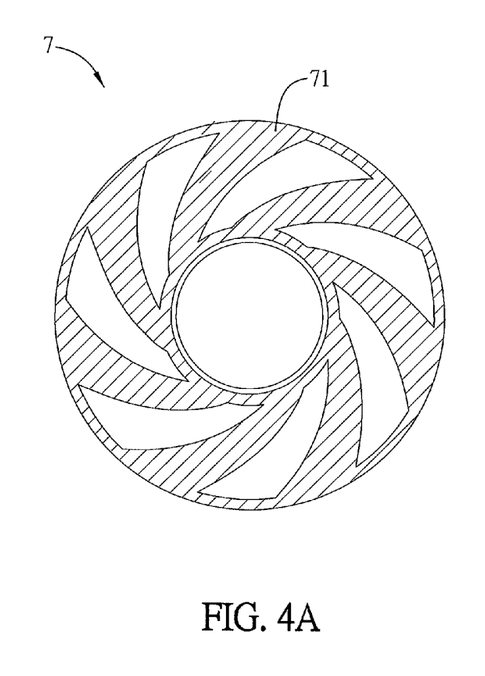
FIG. 4A is a schematic diagram of a thrust plat.

At least one surface of the thrust plate 7 is formed with a plurality of grooves 71 tapering off from an edge to a center of the thrust plate 7. Referring to FIGS. 1A and 1B in view of FIG. 4A, which is a schematic diagram of the thrust plate 7, one surface of the thrust plate 7 facing the bearing 5 has a groove 71. A gap G is configured between the thrust plate 7 and the bearing 5, and the groove 71 has a radial curved design according to the rotation direction of the motor 1. Accordingly, when the operating motor 1 is dramatically shacked or reversed, the rotor structure will start to shift along the axial direction, so that the thrust plate 7 moves toward the bearing 5 along the axial direction so as to minimize the gap G. Since the motor 1 is still under operation, the thrust plate 7 is rotated along with the shaft 2. When the gap G becomes smaller gradually (about 0.005 mm to 0.01 mm), the lubricant will increase the pressure of the gap G due to the grooves 71, thereby generating the rigidity. That is, the rigidity will be extremely high as the gap G becomes extremely small. At the same time, the magnetic forces generated by the rotor magnet set RM and the stator magnet set SM will push the rotor structure back to the original position and make it rotate stably. Thus, the thrust plate 7 will not contact the bearing 5. Besides, the generated rigidity of the lubricant due to the thrust plate 7 will disappear if the rotor structure is pushed back, so that the rotation balance of the rotor structure is no longer affected. On the other hand, when the motor 1 operates under a normal status, the gap G is located between the thrust plate 7 and the bearing 5, so that no pushing effect will be generated. In this case, the design of the grooves 71 of the thrust plate 7 can maintain the axial balance of the rotor structure, thereby increasing the lifetime of the bearing 5 and thus ensuring the quality of the motor or fan.

Figure 4B:
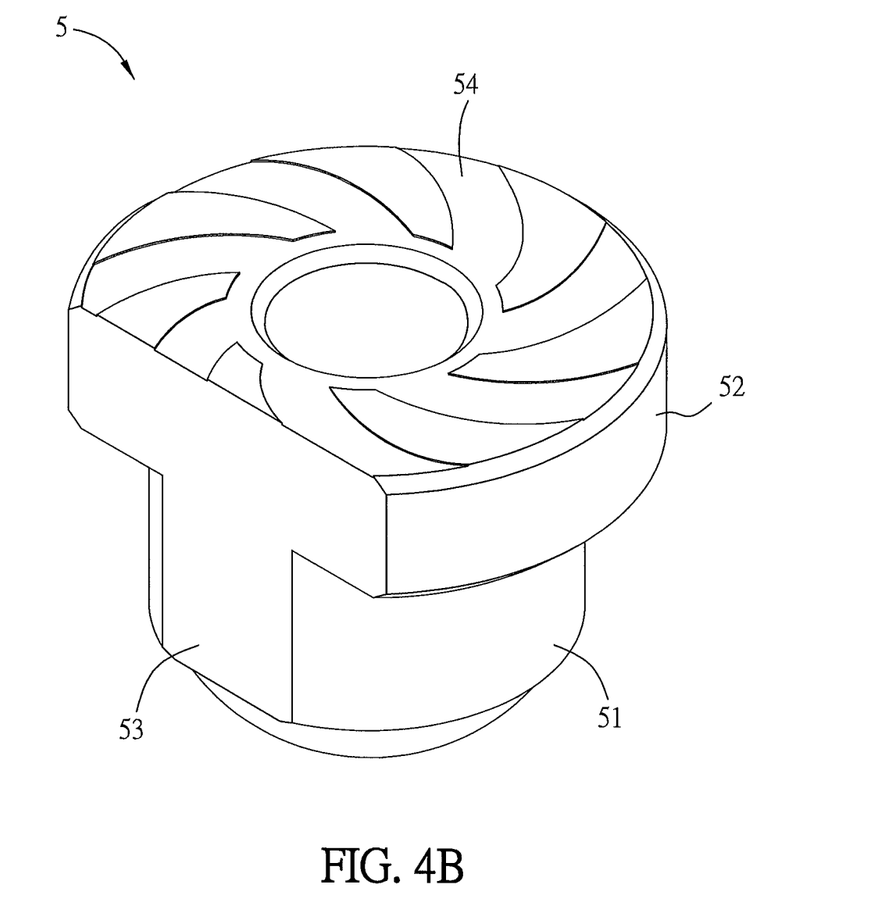
FIG. 4B is a bottom view of the bearing.

FIG. 4B is a bottom view of the bearing 5. Referring to FIG. 4B, a bottom surface of the bearing 5 can have at least one pattern 54. For example, the pattern 54 can include one or more spiral grooves, "<" shape grooves, or a plurality of grooves tapering off from the edge to the center of the bottom surface of the bearing 5. When the pattern 54 includes the grooves tapering off from the edge to the center of the bottom surface of the bearing 5, the leakage of the lubricant can be further prevented and thus the lifetime of the motor or fan can be increased.

Figure 5:
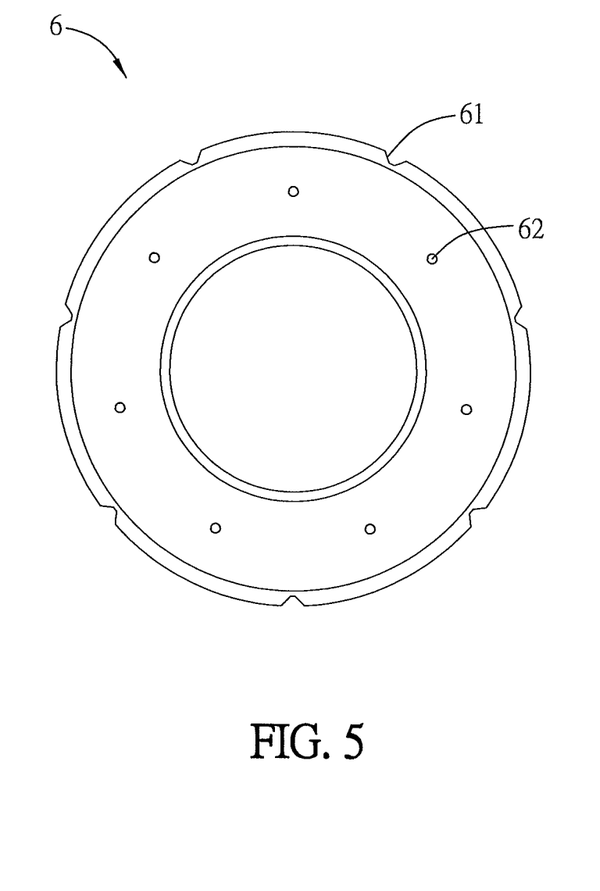
FIG. 5 is a top view of an oil seal.

The oil seal 6 is formed with at least one or more discharge trenches 61. FIG. 5 is a top view of the oil seal 6. Referring to FIGS. 1A and 5, the outer surface of the oil seal 6 is formed with seven discharge trenches 61, which can be formed by lathe process or initially integrated with the oil seal 6. Accordingly, some pores can be formed between the bushing 4 and the discharge trenches 61 of the oil seal 6 for communicating the top and bottom surfaces of the oil seal 6. When the rotor structure is rotated in a high speed, the lubricant will be heated so as to generate waste gas, which can be exhausted from the bushing 4 through the pores. This configuration can reduce the unbalance of the rotor and prevent the generation of carbide material so as to minimize the risk of lubricant deterioration, thereby increasing the lifetime of the bearing 5 and thus ensuring the quality of the motor or fan.

In addition, the pores may have a tapered design along the direction toward the rotor shell 3 for preventing the leakage of the lubricant. In more detail, the inner diameter of the top portion of the bushing 4 can be slightly enlarged, or a part of the discharge trenches 61 at the top portion of the oil seal 6 can be slightly deeper. Accordingly, when the lubricant is transferred along the pores from the lower surface of the oil seal 6 to the wider part of the pores due to capillary phenomenon, the surface tension of the lubricant will be larger than the adhesion force so that the lubricant can be remained at a certain height and will not overflow or leak out.

Similarly, the oil seal 6 can also be formed with at least one or more through holes 62 for achieving the desired waste gas discharging effect. In specific, as shown in FIG. 5, the through holes 62 are disposed through the top and bottom surfaces of the oil seal 6. The waste gas generated by the heated lubricant can be exhausted from the bushing 4 via the through holes 62, thereby reducing the unbalance of the rotor and preventing the generation of carbide material so as to minimize the risk of lubricant deterioration. Accordingly, this configuration can increase the lifetime of the bearing 5 and thus ensure the quality of the motor or fan. Besides, the diameter of the through hole 62 is between 0.2 mm and 0.8 mm, and is preferably 0.5 mm. When the diameter of the through hole 62 is properly designed within the above range, the lifetime of the bearing 5 can be further improved.

To be noted, the oil seal 6 may include only the discharge trench 61 or only the through hole 62, or it may include both of the discharge trench 61 or only the through hole 62. Any of the above configurations can achieve the desired gas discharging effect. As shown in FIG. 5, the disclosed aspect includes both of the discharge trench 61 or only the through hole 62 for example.

Similarly, the bushing 4 can also be formed with at least one or more through holes or discharge trenches 44. As shown in FIG. 1B, the inner surface of the bushing 4 is formed with discharging trenches 44, so that the gaps (as mentioned above) can be formed between the bushing 4 and the oil seal 6 so as to achieve the same discharging effect. Of course, the bushing 4 may also be configured with the structure similar to the through hole 62 of the oil seal 6.

In this embodiment, the bushing 4 is an integrated structure. Accordingly, the assembling procedure includes: providing the bushing 4, placing the wear plate 8 at the bottom of the accommodating space 41 of the bushing 4, placing the connected thrust plate 7 and the shaft 2 into the accommodating space 41, placing the bearing 5 into the accommodating space 41 and telescoping on the shaft 2 (the shaft 2 is disposed through the bearing 5), injecting the lubricant, disposing the oil seal 6, and connecting the rotor shell 3 to the shaft 2. In brief, the motor 1 is assembled from the top. Of course, the above assembling procedure is for an illustration only. For example, the connection of the thrust plate 7 and the shaft 2 can be done before or along with the assembling of the motor 1. Similarly, the bearing 5 can be telescoped on the connected thrust plate 7 and the shaft 2 and then disposed into the accommodating space 41. To be noted, the wear plate 8 is not an essential element. The additional configuration of the wear plate 8 can extend the lifetime of the shaft 2 so as to improve the efficiency and lifespan of the motor or fan.

Figure 6:
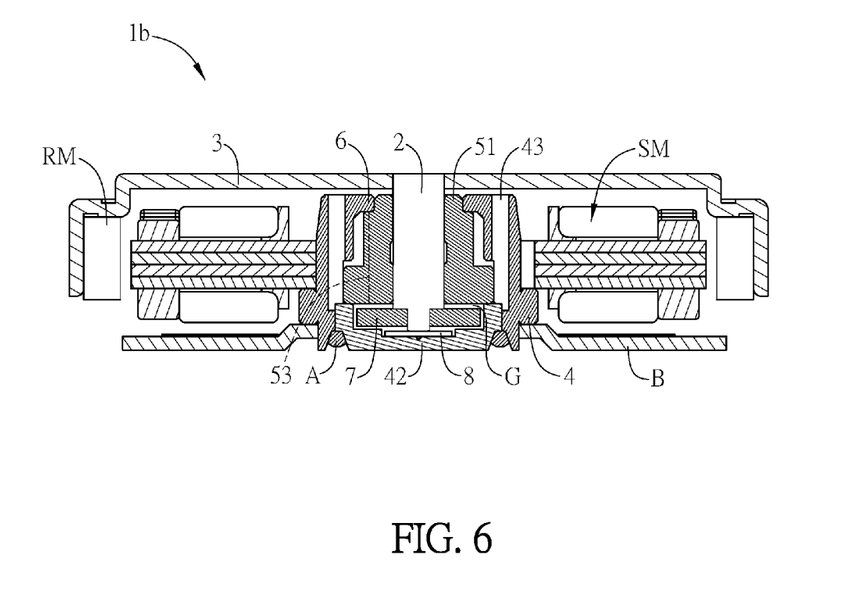
FIG. 6 is a schematic diagram showing a motor according to yet another preferred embodiment of the invention.

FIG. 6 is a schematic diagram showing a motor 1b according to yet another preferred embodiment of the invention. Referring to FIG. 6, in this embodiment, the bushing 4 and the oil seal 6 of the motor 1b are integrated as a single structure. In this case, a side wall of the bushing 4 is formed with at least one or more channels 43 for communicating the bottom and top of the bearing 5. Accordingly, the waste gas generated by the heated lubricant can be properly exhausted from the bushing 4 through the channel 43, thereby reducing the unbalance of the rotor and preventing the generation of carbide material so as to minimize the risk of lubricant deterioration. This configuration can increase the lifetime of the bearing 5 and thus ensure the quality of the motor or fan. Besides, the width of the channel 43 is between 0.2 mm and 0.8 mm, and is preferably 0.5 mm. When the width of the channel 43 is properly designed within the above range, the lifetime of the bearing 5 can be further improved.

In this embodiment, since the bushing 4 and the oil seal 6 are integrated as a single structure, the bottom of the bushing 4 is modified to a bottom cover 42, which is capable of assembling with the side wall of the bushing 4, for the following assembling of the motor 1b. This modification can improve the balance of the fan.

Referring to FIGS. 1A and 6, the shaft 2 of FIG. 1A is a cylinder with uniform diameter, and the thrust plate 7 is preferably connected with the shaft 2 by welding or interfering. As shown in FIG. 7, the shaft 2 has a smaller diameter at the end portion, so that the thrust plate 7 can be firmly fitted at the end portion of the shaft 2. When the thrust plate 7 moves upwardly along the axial direction, it can be stopped by the part of the shaft 2 with wider diameter so that the thrust plate 7 will not shift in the axial direction. In addition, the connection of the shaft 2 and the thrust plate 7 is for an illustration only and is not to limit the scope of the invention.

In order to prevent the overflow and leakage of the lubricant from the bushing 4, the surface of the oil seal 6 can be further formed with an oil repellent layer for decreasing the adhesion force of the lubricant on the oil seal 6. This configuration can further prevent the leakage of the lubricant and thus increase the lifetime of the motor or fan. Accordingly, since the surface tension of the lubricant is larger than the adhesion force thereof, the lubricant will not be leaked through the gap due to capillary phenomenon. In practice, the oil repellent layer can be formed by coating the oil seal 6 with oil repellent agent or dipping the oil seal 6 into the oil repellent agent.

Similarly, the surface of the bushing 4 can also be formed with an oil repellent layer. In this embodiment, the inner surface of the bushing 4 corresponding to the accommodating space 41 is formed with the oil repellent layer, so that the lubricant will not be attached to the bushing 4. The detailed description thereof can be referred to the above embodiment and will not be repeated. Similarly, the surface of the rotor shell 3 facing the bearing 5 can also be formed with an oil repellent layer.

In summary, the motor of the invention is configured with a thrust plate for maintaining the axial balance of the rotor structure, thereby increasing the lifespan of the bearing and the quality of the motor.

In some embodiments, the bushing or oil seal is designed with a channel, discharge trench or through hole, so that the waste gas generated inside the bushing as the motor operates can be properly exhausted. Thus, the operation of the motor will not be affected so as to increase the lifespan of the bearing and the quality of the motor.

In addition, it is also possible to provide an oil repellent layer for decreasing the adhesive force of the lubricant, thereby preventing the leakage of the lubricant and thus increasing the lifespan of the motor.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor comprising;
    a shaft;
    a rotor shell connected with the shaft;
    a bushing having an accommodating space, wherein a bottom of the accommodating space is configured with a wear plate corresponding to the shaft, and one end of the shaft is in contact with the wear plate;
    a bearing disposed in the accommodating space, having a curved outer side surface and only one T-shaped cut-off flat surface, wherein the curved outer side surface has a top end portion and a bottom end portion, wherein the curved outer side surface is connected to the T-shaped cut-off flat surface, the shaft is disposed through the bearing, the T-shaped cut-off flat surface extends to the top end portion and the bottom end portion, wherein the T-shaped cut-off flat surface and an inner wall of the bushing form only one discharging space, a diameter of the top end portion is narrow than a diameter of the bottom end portion, and a space between the top end portion and the inner wall of the bushing communicates with the discharging space for increasing discharging capacity; and
    a thrust plate fixedly connected with the shaft and disposed between the bottom of the accommodating space and a bottom of the bearing, and being located at the end of the shaft and separate from the bearing, wherein one surface of the thrust plate is formed with a plurality of grooves that gradually narrow from an edge to a center of the thrust plate, and a portion of the grooves is exposed to the discharging space,
    wherein the shaft is disposed through the thrust plate, and the thrust plate is rotated along with the shaft and has axial shift simultaneously.

2. The motor of claim 1, further comprising an oil seal covering the bearing and formed with at least one through hole or a discharge trench.

3. The motor of claim 1, wherein a side wall of the bushing is formed with at least one or more channels for communicating the bottom and a top of the bearing.

4. The motor of claim 1, further comprising an oil repellent layer formed on a surface of an oil seal covering the bearing, a surface of the bushing, or a surface of the rotor shell facing the bearing.

5. The motor of claim 1, wherein the bearing is an oil bearing, a hydrodynamic bearing or a ceramic bearing.

6. The motor of claim 1, wherein the end of the shaft has a spherical surface or a curved surface.

7. The motor of claim 1, wherein a bottom surface of the bearing has at least one pattern.

8. The motor of claim 1, further comprising a base, wherein the base and the bushing are integrated as a single structure or detachable structures.

9. The motor of claim 1, wherein all the grooves communicate with each other at the center of the thrust plate.

* * * * *